(12) United States Patent
Himuro

(10) Patent No.: US 6,799,616 B2
(45) Date of Patent: Oct. 5, 2004

(54) PNEUMATIC TIRE INCLUDING AUXILIARY LAND PART HAVING SLOPE

(75) Inventor: Yasuo Himuro, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 59 days.

(21) Appl. No.: 09/756,876

(22) Filed: Jan. 10, 2001

(65) Prior Publication Data

US 2001/0010244 A1 Aug. 2, 2001

(30) Foreign Application Priority Data

Jan. 17, 2000 (JP) ........................................ 2000-007872

(51) Int. Cl.⁷ .......................... B60C 11/03; B60C 11/13; B60C 103/04; B60C 115/00
(52) U.S. Cl. ............................ 152/209.15; 152/209.21; 152/209.22; 152/209.27; 152/209.28
(58) Field of Search ........................ 152/209.15, 209.28, 152/209.21, 209.27, 209.22

(56) References Cited

U.S. PATENT DOCUMENTS

| | | | | |
|---|---|---|---|---|
| 2,327,057 A | * | 8/1943 | Ofensend | |
| 4,299,264 A | * | 11/1981 | Williams | |
| 5,240,053 A | * | 8/1993 | Baumhofer et al. | ... 152/209.22 |
| D387,023 S | * | 12/1997 | Sato et al. | |
| 5,746,849 A | * | 5/1998 | Hutson et al. | |
| 6,213,180 B1 | * | 4/2001 | Himuro | |

FOREIGN PATENT DOCUMENTS

| | | | |
|---|---|---|---|
| EP | 565270 | * | 10/1993 |
| EP | 0 812 709 A1 | | 12/1997 |
| EP | 1 075 971 A1 | | 2/2001 |
| JP | 62-194909 | * | 8/1987 |
| JP | 4-19202 | * | 1/1992 |
| JP | 9-2021 | * | 1/1997 |
| JP | 9-2024 | * | 1/1997 |
| WO | WO 99/17944 | * | 4/1999 |

OTHER PUBLICATIONS

Machine Translation for Japan 9–2024.*

* cited by examiner

Primary Examiner—Steven D. Maki
(74) Attorney, Agent, or Firm—Sughrue Mion, PLLC

(57) ABSTRACT

In a pneumatic tire comprising a tread portion divided into a central region and both side regions, at least one rib-shaped main land part is formed in the central region and a plurality of main slant grooves are arranged so as to extend obliquely from the central region toward each tread end of the tread portion with respect to the equatorial plane to form first slant land parts among these main slant grooves, in which the first slant land part has a plane form of approximately a triangle, and a first auxiliary land part is arranged between the rib-shaped main land part and the main slant groove.

18 Claims, 5 Drawing Sheets

PNEUMATIC TIRE INCLUDING AUXILIARY LAND PART HAVING SLOPE

BACKGROUND OF THE INVENTION

1. Field of the Invention

This invention relates to a pneumatic tire improving drainage performance and steering stability and reducing noise without sacrificing other tire performances.

2. Description of Related Art

As shown in FIG. 5, a tread pattern of a pneumatic tire, e.g. passenger car tire is usual to be defined by circumferential grooves 101–103 extending in parallel to an equatorial plane of the tire and a plurality of slant grooves 104–106 opening to the circumferential grooves 101, 102 and extending obliquely with respect to the equatorial plane toward each end of a tread portion.

In such a tread pattern, drainage in front and back directions of the tire is mainly conducted by the circumferential grooves and drainage toward the side of the tire is conducted by the slant grooves, whereby an excellent drainage performance can be given to the tire.

In order to more improve the drainage performance in the tire having such a tread pattern, it is useful to widen a groove width to increase a groove area or so-called negative ratio, or to render the slant groove into such so-called high-angle arranging form that an inclination angle of a groove portion located in a central region of the tread with respect to the equatorial plane is made relatively small and an inclination angle of a groove portion located in each side region of the tread with respect to the equatorial plane is made relatively large.

However, when the negative ratio is increased only by widening the groove width or the like, there is a problem that the pattern noise is apt to be easily increased through the drainage performance is improved.

On the other hand, when the slant grooves are arranged in the high-angle form, there is a problem that the stiffness of the slant land portion defined by the slant grooves is apt to be lacking and the sufficient steering stability is not obtained.

Further, when the slant groove is opened to the circumferential groove, water flowing in the slant groove collides with water flowing in the circumferential groove at a position of an opening part to cause disorder of water flow, create bubbles and the like, so that there is a problem that the drainage performance is not obtained to an expected level.

From a viewpoint of noise reduction, it is effective to terminate the slant groove in the land portion without opening to the circumferential groove. In this case, however, there is generally a problem that it is difficult to obtain the sufficient drainage performance.

SUMMARY OF THE INVENTION

It is, therefore, an object of the invention to provide a pneumatic tire wherein all of drainage performance, steering stability and noise can be improved to satisfactory levels by adopting a tread pattern having a rib-shaped main land part arranged in a central region of a tread portion and rationalizing a plane shape (ground contact face) of a first slant land part defined by main slant grooves and arranging a first auxiliary land part of an adequate form between the rib-shaped main land part and the main slant groove.

For this end, the inventor has made various studies in order to develop tires having a tread pattern capable of realizing all of the improvements of drainage performance and steering stability and the reduction of noise, and found out that both of the steering stability and the drainage performance can effectively be improved by adopting a tread pattern useful for the reduction of noise, i.e. a tread pattern that a first auxiliary land part of an adequate form is arranged between a rib-shaped main land part and a main slant groove so as not to open the main slant groove to a first circumferential fine groove at least located in a central region, and rationalizing a plane shape (ground contact face) of a first slant land part defined by the main slant grooves.

According to the invention, there is the provision of a pneumatic tire comprising a tread portion divided into a central region and both side regions, at least one rib-shaped main land part formed in the central region and extending substantially in parallel to an equatorial plane of the tire, a plurality of main slant grooves extending obliquely from the central region toward each tread end of the tread portion with respect to the equatorial plane to form first slant land parts among these main slant grooves, in which the first slant land part has a plane form of approximately a triangle gradually increasing a width of the land part from a side of the equatorial plane toward a side of the tread end, and a first auxiliary land part having such a slope that a height of the land part gradually decreases toward a groove bottom of the main slant groove is arranged between the rib-shaped main land part and the main slant groove.

The term "central region" used herein means a region centering on a position of the equatorial plane and corresponding to 5–50% of a tread width TW, and the term "both side regions" are regions located at both sides of the central region.

When the stiffness of the land part is important, the rib-shaped main land part is favorable to be integrally united with the first slant land part.

When it is required to more improve ground contacting property and drainage performance in the central region, it is favorable to arrange at least one first circumferential fine groove extending substantially in parallel to the equatorial plane in the rib-shaped main land part.

The first circumferential fine groove is favorable to have a sectional shape that a groove width becomes wide at a position of the groove bottom and becomes narrow at a position of a ground contact face of the tread portion. Particularly, the first circumferential fine groove is favorable to have a sectional shape of approximately a conical flask.

When the drainage performance is important, it is favorable that a plurality of slant sub-grooves each extending obliquely from the side region of the tread portion toward the tread end with respect to the equatorial plane are arranged to form second slant land parts among these slant sub-grooves in which a land width gradually increases toward the tread end.

Moreover, when the stiffness of the land part is important, it is favorable to integrally unite the first slant land part with the second slant land part.

When it is required to enhance the drainage performance toward the side of the tire, it is favorable that a second auxiliary land part having such a slope that a land height gradually decreases toward the groove bottom of the slant sub-groove is arranged between the first slant land part and the slant sub-groove.

When it is required to more enhance the ground contacting property and drainage performance, it is favorable that a second circumferential fine groove extending substantially in parallel to the equatorial plane and having a sectional shape similar to that of the first circumferential fine groove is arranged at a boundary between the first slant land part and the second slant land part.

When it is required to more balancedly improve the steering stability and the noise reduction, it is favorable that a first joint land part connecting the first slant land parts to each other and having an extremely narrow width is arranged along a groove wall of the second circumferential fine groove facing to the side of the equatorial plane and a third auxiliary land part having such a slope that a land height gradually decreases toward a groove bottom of the main slant groove is arranged between the first joint part and the main slant groove.

Moreover, it is more preferable that an angle between the ground contact face of the rib-shaped main land part and the slope of the first auxiliary land part, an angle between the ground contact face of the first slant land part and the slope of the second auxiliary land part and an angle between the ground contact face of the first joint part and the slope of the third auxiliary land part are within a range of 135–170°, respectively.

BRIEF DESCRIPTION OF THE DRAWINGS

The invention will be described with reference to the accompanying drawings, wherein.

DETAILED DESCRIPTION OF THE INVENTION

Figure 1:
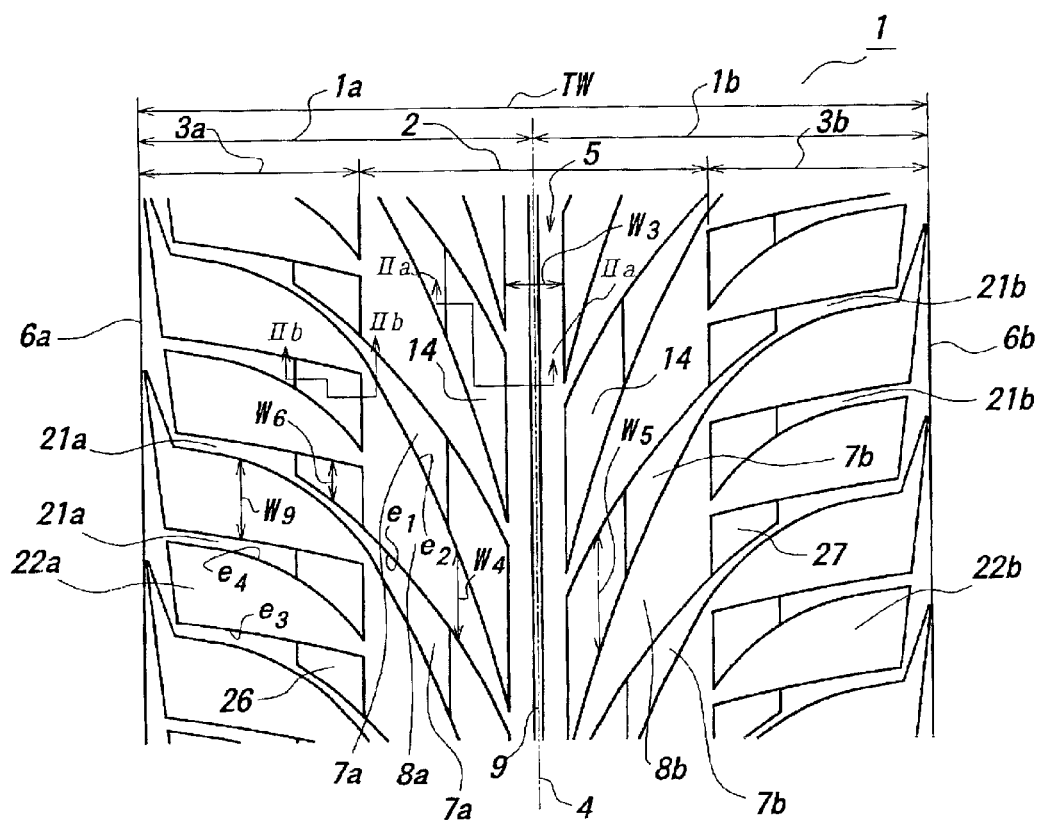
FIG. 1 is a partly developed view of a first embodiment of a tread pattern in the pneumatic tire according to the invention.

In FIG. 1 is shown a typical embodiment of a tread pattern in the pneumatic tire according to the invention, wherein numeral 1 is a tread portion, numeral 2 a central region, numerals 3a, 3b side regions, numeral 4 an equatorial plane of the tire, numeral 5 a rib-shaped main land part, numeral 6a, 6b tread ends, numerals 7a, 7b main slant grooves, numerals 8a, 8b first slant land parts, and numeral 14 a first auxiliary land part.

In the tire having a tread pattern shown in FIG. 1, at least one rib-shaped land part 5 extending substantially in parallel to the equatorial plane 4 (one land part in the illustrated embodiment) is arranged in the central region 2 of the tread portion 1 constituted with the central region 2 and side regions 3a, 3b, and a plurality of main slant grooves 7a, 7b extending obliquely from the central region 2 toward the tread end 6a, 6b with respect to the equatorial plane 4 are arranged to form first slant land parts 8a, 8b between the main slant grooves 7a, 7b and/or 7b, 7b.

Figure 2A:
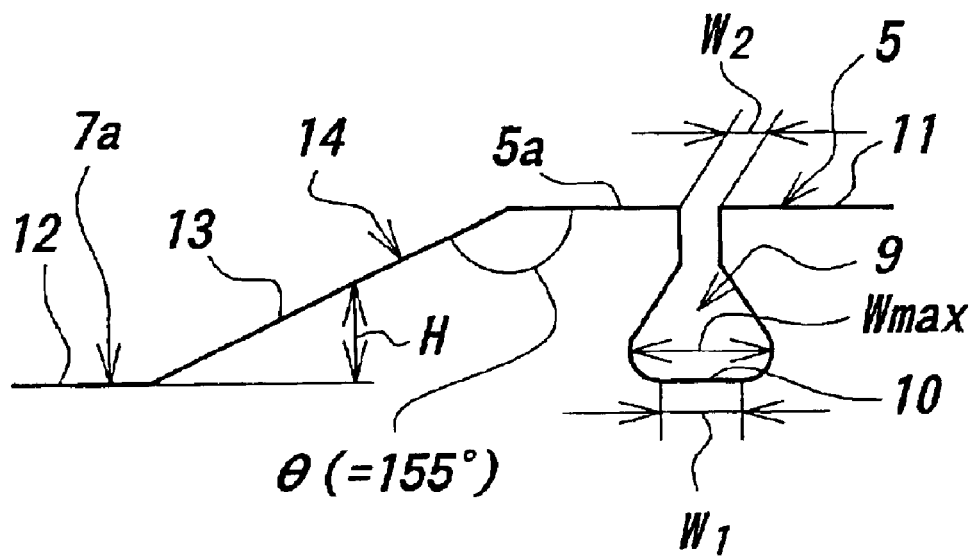
FIG. 2a is a diagrammatically section view taken along a line IIa—IIa of FIG. 1.
Figure 2B:
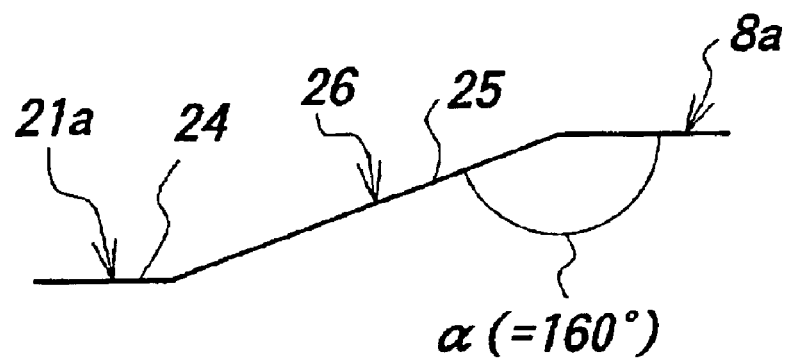
FIG. 2b is a diagrammatically section view taken along a line IIb—IIb of FIG. 1.

A main feature in the construction of the invention lies in that a tread pattern useful for the noise reduction, i.e. a tread pattern wherein a first auxiliary land part 14 of an adequate shape is disposed between the rib-shaped main land part 5 and the slant groove (concretely main slant groove 7a, 7b) and the slant groove is not opened to a circumferential groove at least located in the central region 2 (concretely a first circumferential fine groove 9 as shown in FIG. 1) and also a plane (ground contact face) form of the first slant land part 8a, 8b is rationalized or more concretely the first slant land part 8a, 8b has a plane form of approximately such a triangle that a land width W4 gradually increases from the side of the equatorial plane 4 toward the side of the tread end 6a, 6b, and a first auxiliary land part 14 having such a slope that a land height H gradually decreases toward the groove bottom of the main slant groove 7a, 7b is arranged between the rib-shaped main land part 5 and the main slant groove 7a, 7b (see FIG. 2a). By adopting such a construction can be satisfied the improvement of steering stability and drainage performance and the reduction of noise.

By arranging the rib-shaped main land part 5 in the central region 2 of the tread portion 1 can be smoothly rotated the tire while contacting with ground surface, whereby the pattern noise can be controlled, and the stiffness of the tread portion 1 in the central region 2 can sufficiently be enhanced to improve the steering stability, especially a handling response in the steering at a very slight angle.

And also, the adoption of the tread pattern that the main slant groove 7a, 7b is not opened to the circumferential groove at least arranged in the central region 2 (concretely a first circumferential fine groove 9) is advantageous for the noise reduction.

In addition, an area of a portion of the first slant land part 8a, 8b located side the equatorial plane 4 is made narrower and an area of a portion located side the tread end 6a, 6b is made wider, whereby the stiffness of the land part at the side region 3a, 3b becomes higher to improve the steering stability and also a negative ratio in the central region 2 is made relatively larger than that of the side region 3a, 3b to improve the drainage performance and hence the steering stability and the drainage performance can be balancedly improved.

As shown in FIG. 2a, the first auxiliary land part 14 having such a slope 13 that a land height H gradually decreases toward the groove bottom 12 of the main slant groove 7a, 7b is arranged between the rib-shaped main land part 5 and the main slant groove 7a, 7b, whereby the rib-shaped main land part 5 is reinforced to more increase the stiffness and hence the steering stability can be more improved and water located in the central region 2 during the contact with ground surface can smoothly be flowed into the main slant groove 7a, 7b along the slope 13 of the first auxiliary land part 14 without causing disorder to more improve the drainage performance.

In the invention, therefore, the improvements of the steering stability and the drainage performance and the noise reduction can simultaneously be satisfied by adopting the above construction.

Moreover, an angle θ between a ground contact face 5a of the rib-shaped main land part 5 and a slope 13 of the first auxiliary land part 14 is preferably within a range of 135–170°. When the angle θ is less than 135°, there is caused a fear that an effect of sufficiently reinforcing the stiffness is not obtained, while when the angle θ exceeds 170°, the groove volume of the main slant groove 7a, 7b becomes extremely small and there is caused a fear of degrading the drainage performance.

As shown in FIG. 1, the rib-shaped main land part 5 may be integrally united with the first slant land part 8a, 8b, whereby the stiffness of the whole land part inclusive of the rib-shaped main land part 5 located in the central region 2 can be increased to advantageously improve the steering stability.

And also, a first circumferential fine groove 9 may be arranged in the rib-shaped main land part 5 as shown in FIG. 1, whereby the ground contacting property in the central region 2 of the tread portion 1 can be enhanced. In addition, the first circumferential fine groove 9 is not opened to the main slant groove 7a, 7b, so that water existing in the central region 2 of the tread portion 1 during the contacting of the tire with ground surface is entrapped in the first circumferential fine groove 9 and rapidly discharged along the first circumferential fine groove 9 in front-back direction of the tire without causing disorder state in the fine groove and hence the drainage performance is effectively enhanced.

Furthermore, as shown in FIG. 2a, the first circumferential fine groove 9 is made to have such a sectional shape that a groove width $W_1$ at a position 10 of the groove bottom becomes wide and a groove width $W_2$ at a position 11 of a ground contact face of the tread portion becomes narrow, whereby the groove volume of the first circumferential fine groove 9 can be increased to more effectively improve the drainage performance.

As the wearing of the tread portion 1 proceeds to a certain level, it tends to decrease the groove volume to lower the drainage performance. However, when the first circumferential fine groove 9 is rendered into the above sectional shape, the lowering of the drainage performance can be made up.

In the invention, a width-wide circumferential groove is not arranged in the tread portion 1, so that the occurrence of high-frequency noise due to columnar resonance is less, which advantageously acts to the noise reduction.

Especially, the first circumferential fine groove 9 is favorable to have a sectional shape of approximately a conical flask as shown in FIG. 2a.

If the first slant land part 8a, 8b is integrally united with a second slant land part 22a, 22b as shown in FIG. 1, there is provided an effect of more reducing the pattern noise.

If irregular wear of the second slant land part 22a, 22b (more concretely heel and toe wear) can be suppressed, the deterioration of noise after the progress of the wearing can also be controlled. As means for suppressing the irregular wear of the second slant land part 22a, 22b, therefore, there can be mentioned a case that a plurality of slant sub-grooves 21a, 21b each extending obliquely from the side region 3a, 3b of the tread portion 1 toward the tread end 6a, 6b with respect to the equatorial plane 4 are arranged to define a second slant land part 22a, 22b gradually increasing a land width toward the tread end 6a, 6b between these slant sub-grooves 21a, 21b. More preferably, a second auxiliary land part 26 having such a slope 25 that a land height H gradually decreases toward a groove bottom 24 of the slant sub-groove 21a, 21b is arranged between the first slant land part 8a, 8b and the slant sub-groove 21a, 21b.

Figure 3:
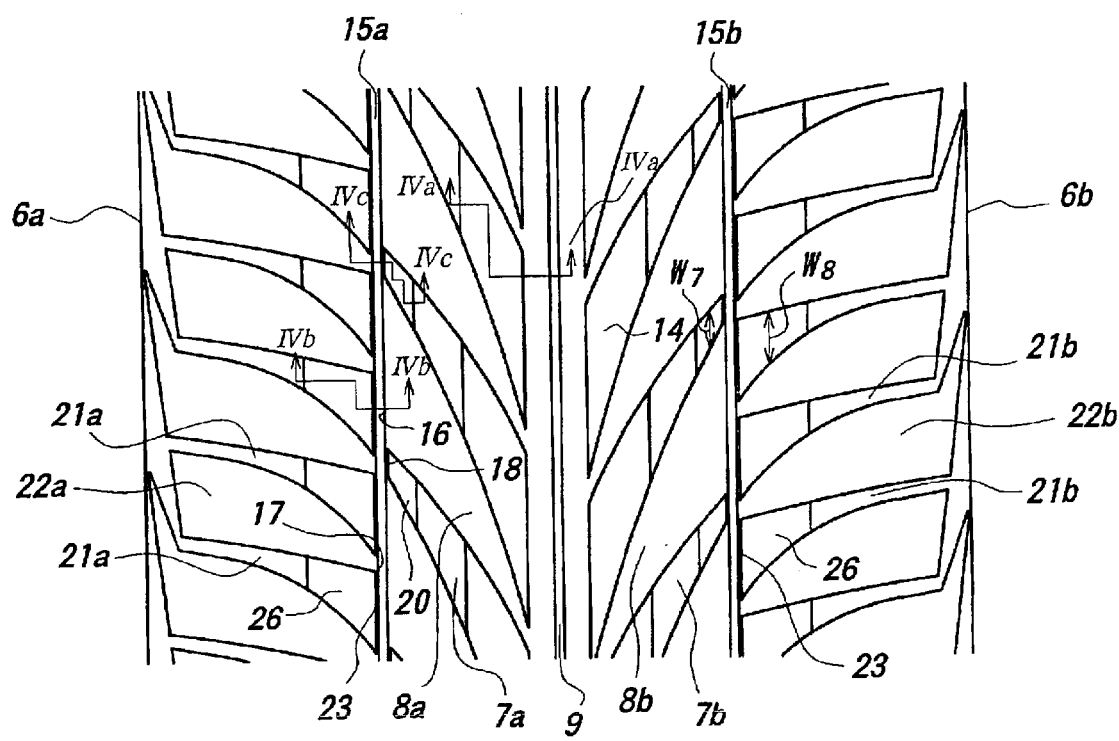
FIG. 3 is a partly developed view of a second embodiment of a tread pattern in the pneumatic tire according to the invention.

If it is required to more balancedly improve the ground contacting property and the drainage performance, as shown in FIG. 3, it is favorable that a second circumferential fine groove 15a, 15b extending substantially in parallel to the equatorial plane 4 and having a sectional shape similar to that of the first circumferential fine groove 9 is arranged at a position of a boundary between the first slant land part 8a, 8b and the second slant land part 22a, 22b.

Further, a second joint land part 23 of an extremely narrow width connecting the second slant land parts 22a, 22b to each other is arranged along a groove wall 17 of the second circumferential fine groove 15a, 15b located at the side of the tread end 6a, 6b and the second auxiliary land part 26 is disposed between the second joint land part 23 and the slant sub-groove 21a, 21b to reinforce the second joint land part 23, whereby the stiffness becomes more higher to more improve the steering stability and also water can smoothly be flowed into the slant sub-groove 21a, 21b without causing disorder in the sub-groove to thereby more improve the drainage performance.

Moreover, an angle β between a ground contact face 23a of the second joint land part 23 and a slope 25 of the second auxiliary land part 26 is favorable to be within a range of 135–170° from the same reason as in the case of the angle θ.

Figure 4A:
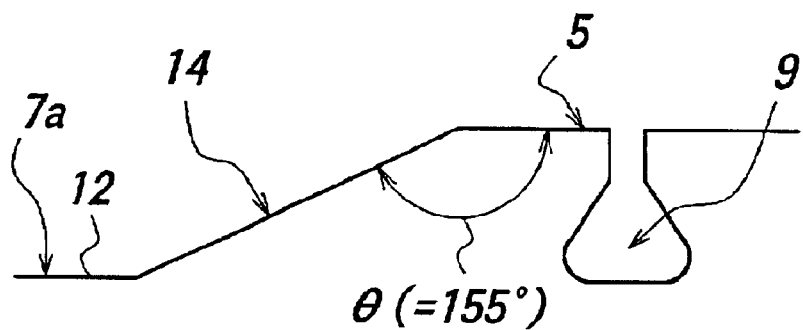
FIG. 4a is a diagrammatically section view taken along a line IVa—IVa of FIG. 3.
Figure 4B:
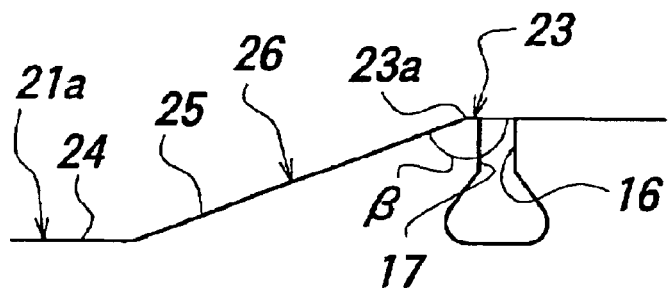
FIG. 4b is a diagrammatically section view taken along a line IVb—IVb of FIG. 3.
Figure 4C:
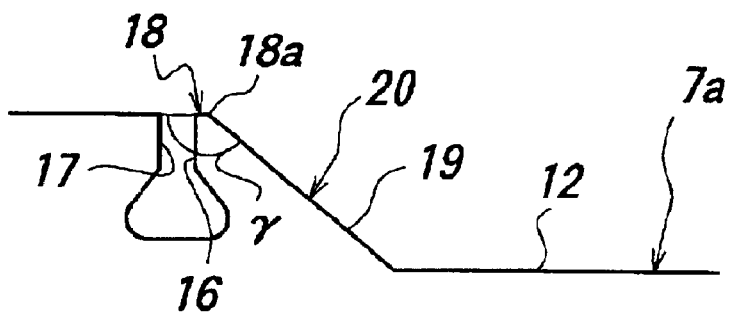
FIG. 4c is a diagrammatically section view taken along a line IVc—IVc of FIG. 3.

In addition, a first joint land part 18 of an extremely narrow width connecting the first slant land parts 8a, 8b to each other is arranged along a groove wall 16 of the second circumferential fine groove 15a, 15b located at the side of the equatorial plane 4 and a third auxiliary land part 20 having a slope 19 that a land height H gradually decreases toward the groove bottom 12 of the main slant groove 7a, 7b is arranged between the first joint part 18 and the main slant groove 7a, 7b as shown in FIG. 4c, whereby the stiffness is increased while maintaining the negative ratio on the surface to thereby improve the steering stability and noise reduction while suppressing the lowering of the drainage performance.

Moreover, an angle γ between a ground contact face 18a of the first joint land part 18 and the slope 19 of the third auxiliary land part 20 is favorable to be within a range of 135–170°. When the angle γ is less than 135°, the sufficient stiffness is not obtained, while when it exceeds 170°, the sufficient groove volume is not obtained.

Although the above merely shows an embodiment of the invention, various modifications may be conducted within a scope of the invention. For instance, the main slant grooves 7a, 7b are arranged in a direction successively entering into the ground contact region from the side of the equatorial plane 4 toward the respective tread end 6a, 6b to form so-called directional pattern as shown in FIG. 1, which is favorable in a point that the sufficient drainage performance is obtained.

The following examples are given in illustration of the invention and are not intended as limitations thereof.

EXAMPLE 1

There is provided a pneumatic tire having a tread pattern shown in FIG. 1 and a tire size of PSR205/55R16, in which dimensions of a rib-shaped land part, first circumferential fine groove, main slant groove, first slant land part, first auxiliary land part and the like are shown in Table 1. Moreover, the tire structure other than the tread portion is substantially the same as in the usual pneumatic tire for passenger car.

TABLE 1

|  | Land width (mm) | Arranging angle (°) | Land height (mm) |
|---|---|---|---|
| Rib-shaped main land part 5 | $W_3$: 18 | 0 | 8 |
| First slant land part 8a, 8b | $W_4$: 5–50 | Edge at precedent ground contacting side $e_1$: 20–30 | 8 |

TABLE 1-continued

|  | | Edge at subsequent ground contacting side $e_2$: 10–20 | |
|---|---|---|---|
| Second slant land part 22a, 22b | $W_9$: 5–25 | Edge at precedent ground contacting side $e_3$: 70–80 Edge at subsequent ground contacting side $e_4$: 35–45 | 8 |
| First auxiliary land part 14 | $W_5$: 55–25 | $\theta = 155$ | 8–0 |
| Second auxiliary land part 26 | W6: 20–8 | $\alpha = 160$ | 6.5–0 |

|  | Groove width (mm) | Groove angle (°) | Groove depth (mm) |
|---|---|---|---|
| Main slant groove 7a, 7b | 11–3 | 15–45 | 8 |
| Slant sub-groove 21a, 21b | 3–9–5 | 40–80 | 6.5 |
| First circumferential fine groove 9 | $W_1$: 4, $W_2$: 2 $W_{max}$: 6 | 0 | 8 |

EXAMPLE 2

There is provided a pneumatic tire having a tread pattern shown in FIG. 3 and a tire size of PSR205/55R16, in which dimensions of a rib-shaped land part, first circumferential fine groove, main slant groove, first slant land part, first auxiliary land part and the like are shown in Table 2.

TABLE 2

|  | Land width (mm) | Arranging angle (°) | Land height (mm) |
|---|---|---|---|
| Rib-shaped main land part 5 | $W_3$: 18 | 0 | 8 |
| First slant land part 8a, 8b | $W_4$: 5–50 | Edge at precedent ground contacting side $e_1$: 20–30 Edge at subsequent ground contacting side $e_2$: 10–20 | 8 |
| Second slant land part 22a, 22b | $W_9$: 5–25 | Edge at precedent ground contacting side $e_3$: 70–80 Edge at subsequent ground contacting side $e_4$: 35–45 | 8 |
| First joint land part 23 | width: 25 | 0 | 8 |
| Second joint land part 18 | width: 8 | 0 | 8 |
| First auxiliary land part 14 | $W_5$: 55–25 | $\theta = 155$ | 8–0 |
| Second auxiliary land part 26 | $W_8$: 25–10 | $\beta = 160$ | 6.5–0 |
| Third auxiliary land part 20 | $W_7$: 8–15 | $\gamma = 135$ | 8–0 |

|  | Groove width (mm) | Groove angle (°) | Groove depth (mm) |
|---|---|---|---|
| Main slant groove 7a, 7b | 11–3 | 15–45 | 8 |
| Slant sub-groove 28a, 28b | 10–5 | 70–80 | 6.5 |
| First circumferential fine groove 9 | $W_1$: 4, $W_2$: 2 $W_{max}$: 6 | 0 | 8 |
| Second circumferential fine groove 15a, 15b | $W_1$: 4, $W_2$: 2 $W_{max}$: 5 | 0 | 6.5 |

EXAMPLE 3

There is provided a pneumatic tire having substantially the same structure as in Example 1 except that the first circumferential fine groove is not arranged.

CONVENTIONAL EXAMPLE

Figure 5:
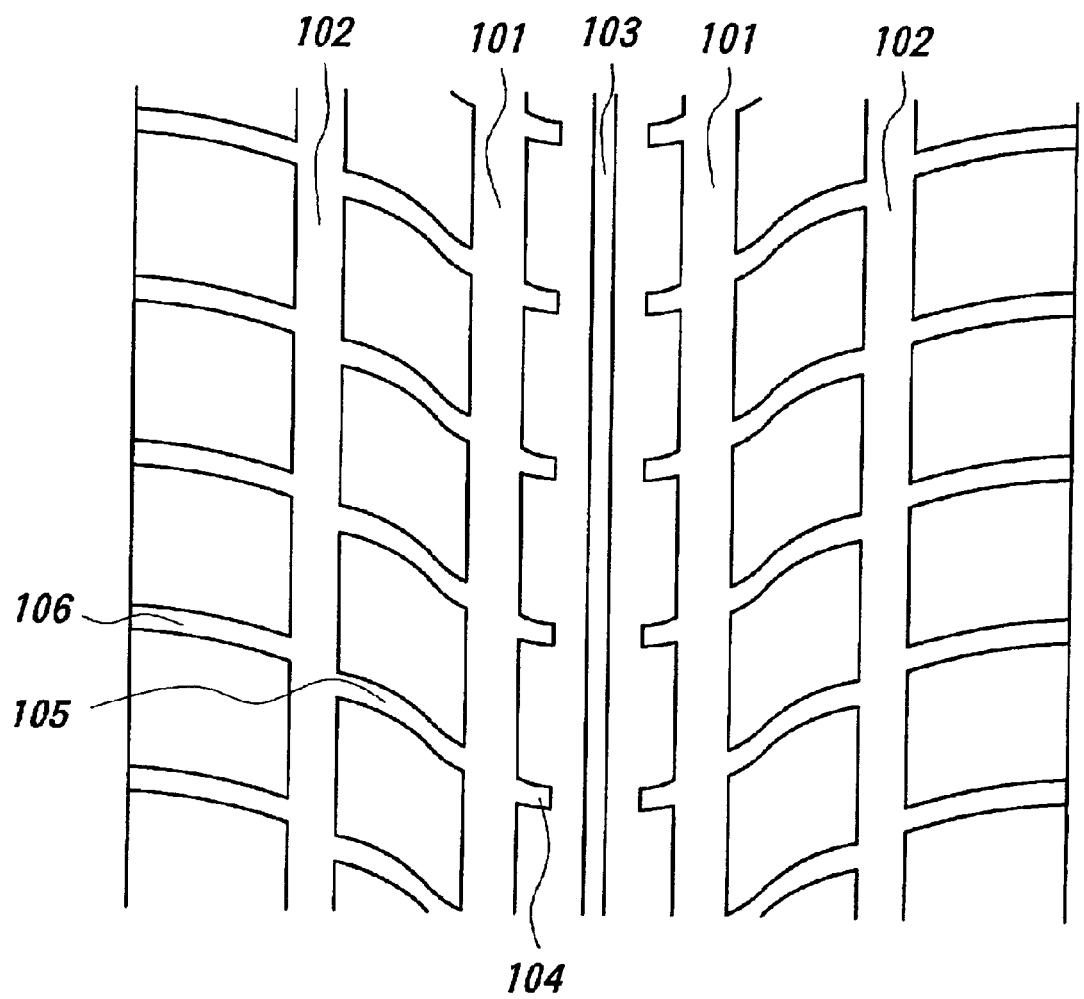
FIG. 5 is a partly developed view of a tread pattern in the conventional pneumatic tire.

There is provided a conventional pneumatic tire having a tread pattern shown in FIG. 5 and a tire size of PSR205/55R16, in which dimensions of circumferential grooves 101–103, slant grooves 104–106 and the like are shown in Table 3.

TABLE 3

|  | Groove width (mm) | Groove angle (°) | Groove depth (mm) |
|---|---|---|---|
| Circumferential groove 101 | 8 | 0 | 8 |
| Circumferential groove 102 | 7 | 0 | 8 |
| Circumferential groove 103 | 3 | 0 | 8 |
| Slant groove 104 | 4 | 80 | 6.5 |
| Slant groove 105 | 4.5–5.0 | 50–70 | 6.5 |
| Slant groove 106 | 5 | 75 | 6.5 |

With respect to the above tires, the drainage performance, steering stability and pattern noise are evaluated as follows.

Each of the above tires is mounted onto an approved rim (61/2JJ) and inflated under an internal pressure of 230 kPa and subjected to the following actual running test under a load corresponding to two crew members.

The drainage performance is evaluated in each of straight running and cornering. The drainage performance in the straight running is evaluated by measuring a limit speed in the occurrence of hydroplaning phenomenon when the tire is running straightforward on a road surface having a water depth of 5 mm. The drainage performance in the cornering is evaluated by measuring a lateral G in the occurrence of hydroplaning when the tire is run on a road surface having a radius of 80 m and a water depth of 5 mm.

The steering stability is evaluated by a feeling of a test driver when the vehicle is run on a circuit course of dry state under various sport running modes.

The pattern noise is evaluated by a feeling of a test driver on an indoor noise when the vehicle is run by inertia from a speed of 100 km/h on a straight smooth road surface.

These evaluation results are shown in Table 4. Moreover, each numerical value of the drainage performances A and B, steering stability and pattern noise in Table 4 is represented by an index on the basis that the conventional example is 100, in which the larger the index value, the better the property.

TABLE 4

|  | Conventional Example | Example 1 | Example 2 | Example 3 |
|---|---|---|---|---|
| Drainage performance A[*1] | 100 | 120 | 115 | 105 |
| Drainage performance B[*2] | 100 | 120 | 115 | 110 |
| Steering stability[*3] | 100 | 120 | 120 | 125 |
| Pattern noise | 100 | 120 | 125 | 130 |

[*1]straight running
[*2]cornering
[*3]running on dry road surface

As seen from Table 4, the tires of Examples 1–3 are excellent in the drainage performance and the steering stability and the reduction of pattern noise as compared with the conventional tire.

As mentioned above, according to the invention, there can be provided pneumatic tires having excellent drainage performance and steering stability and low noise without sacrificing the other tire performances.

What is claimed is:

1. A pneumatic tire comprising:
a tread portion divided into a central region and both side regions,
at least one rib-shaped main land part formed in the central region and extending substantially in parallel to an equatorial plane of the tire,
a plurality of main slant grooves extending obliquely from the central region toward each tread end of the tread portion with respect to the equatorial plane to form first slant land parts among these main slant grooves,
in which each first slant land part has a plane form of approximately a triangle gradually increasing a width of the land part from a side of the equatorial plane toward a side of the tread end,
and a first auxiliary land part having such a slope that a height of the land part gradually decreases toward a groove bottom of the main slant groove is arranged between the rib-shaped main land part and the main slant groove, wherein:
the slope of the first auxiliary land part joins the groove walls of the main slant groove; and
the rib-shaped main land part is integrally united with the first slant land part.

2. A pneumatic tire according to claim 1, wherein at least one first circumferential fine groove extending substantially in parallel to the equatorial plane is arranged in the rib-shaped main land part.

3. A pneumatic tire according to claim 2, wherein the first circumferential fine groove has a sectional shape that a groove width becomes wide at a position of the groove bottom and becomes narrow at a position of a ground contact face of the tread portion.

4. A pneumatic tire according to claim 3, wherein the first circumferential fine groove has a sectional shape of approximately a conical flask.

5. A pneumatic tire according to claim 1, wherein a plurality of slant sub-grooves each extending obliquely from the side region of the tread portion toward the tread end with respect to the equatorial plane are arranged to form second slant land parts among these slant sub-grooves in which a land width gradually increases toward the tread end.

6. A pneumatic tire according to claim 5, wherein the first slant land part is integrally united with the second slant land part.

7. A pneumatic tire according to claim 5, wherein a second auxiliary land part having such a slope that a land height gradually decreases toward the groove bottom of the slant sub-groove is arranged between the first slant land part and the slant sub-groove.

8. A pneumatic tire according to claim 7, wherein an angle between the ground contact face of the first slant land part and the slope of the second auxiliary land part is within a range of 135–170°.

9. A pneumatic tire according to claim 5, wherein a circumferential fine groove extending substantially in parallel to the equatorial plane is arranged at a boundary between the first slant land part and the second slant land part, wherein:
said circumferential fine groove has a sectional shape such that a groove width becomes wide at a position of the groove bottom and becomes narrow at a position of a ground contact face of the tread portion.

10. A pneumatic tire according to claim 9, wherein a first joint land part connecting the first slant land parts to each other and having an extremely narrow width is arranged along a groove wall of the second circumferential fine groove facing to the side of the equatorial plane and a third auxiliary land part having such a slope that a land height gradually decreases toward a groove bottom of the main slant groove is arranged between the first joint part and the main slant groove.

11. A pneumatic tire according to claim 10, wherein an angle between the ground contact face of the first joint part and the slope of the third auxiliary land part is within a range of 135–170°.

12. A pneumatic tire according to claim 1, wherein an angle between the ground contact face of the rib-shaped main land part and the slope of the first auxiliary land part is within a range of 135–170°.

13. A pneumatic tire comprising
a tread portion divided into a central region and both side regions,
at least one rib-shaped main land part formed in the central region and extending substantially in parallel to an equatorial plane of the tire,
a plurality of main slant grooves extending obliquely from the central region toward each tread end of the tread portion with respect to the equatorial plane to form first slant land parts among these main slant grooves,
in which each first slant land part forms a continuous ground contact face with the main land part, and has a plane form of approximately a triangle gradually increasing a width of the land part from a side of the equatorial plane toward a side of the tread end,
and a first auxiliary land part, having such a slope that a height of the land part gradually decreases toward a groove bottom of the main slant groove, is arranged between the rib-shaped main land part and the main slant groove.

14. A pneumatic tire comprising
a tread portion divided into a central region and both side regions,
at least one rib-shaped main land part formed in the central region and extending substantially in parallel to an equatorial plane of the tire,
a plurality of main slant grooves extending obliquely from the central region toward each tread end of the tread portion with respect to the equatorial plane to form first slant land parts among these main slant grooves,
in which each first slant land part has a plane form of approximately a triangle gradually increasing a width of the land part from a side of the equatorial plane toward a side of the tread end,
and a first auxiliary land part, having such a slope that a height of the land part gradually decreases toward a groove bottom of the main slant groove, is arranged between the rib-shaped main land part and the main slant groove, and is circumferentially bordered along the entire slope by the first slant land parts,
wherein the rib-shaped main land part is integrally united with the first slant land part.

15. A pneumatic tire comprising:
a tread portion divided into a central region and both side regions,
at least one rib-shaped main land part formed in the central region and extending substantially in parallel to an equatorial plane of the tire,
a plurality of main slant grooves extending obliquely from the central region toward each tread end of the tread portion with respect to the equatorial plane to form first slant land parts among these main slant grooves, in which each first slant land part has a plane form of approximately a triangle gradually increasing a width of the land part from a side of the equatorial plane toward a side of the tread end, and a first auxiliary land part having such a slope that a height of the land part gradually decreases toward a groove bottom of the main slant groove is arranged between the rib-shaped main land part and the main slant groove, wherein:

the slope of the first auxiliary land part joins the groove walls of the main slant groove;

a plurality of slant sub-grooves each extending obliquely from the side region of the tread portion toward the tread end with respect to the equatorial plane are arranged to form second slant land parts among these slant sub-grooves in which a land width gradually increases toward the tread end; and the first slant land part is integrally united with the second slant land part.

16. A pneumatic tire comprising:

a tread portion divided into a central region and both side regions, at least one rib-shaped main land part formed in the central region and extending substantially in parallel to an equatorial plane of the tire, a plurality of main slant grooves extending obliquely from the central region toward each tread end of the tread portion with respect to the equatorial plane to form first slant land parts among these main slant grooves, in which each first slant land part has a plane form of approximately a triangle gradually increasing a width of the land part from a side of the equatorial plane toward a side of the tread end, and a first auxiliary land part having such a slope that a height of the land part gradually decreases toward a groove bottom of the main slant groove is arranged between the rib-shaped main land part and the main slant groove, wherein:

the slope of the first auxiliary land part joins the groove walls of the main slant groove;

a plurality of slant sub-grooves each extending obliquely from the side region of the tread portion toward the tread end with respect to the equatorial plane are arranged to form second slant land parts among these slant sub-grooves in which a land width gradually increases toward the tread end;

a circumferential fine groove extending substantially in parallel to the equatorial plane is arranged at a boundary between the first slant land part and the second slant land part; and said circumferential fine groove has a sectional shape such that a groove width becomes wide at a position of the groove bottom and becomes narrow at a position of a ground contact face of the tread portion.

17. A pneumatic tire according to claim 16, wherein a first joint land part connecting the first slant land parts to each other and having an extremely narrow width is arranged along a groove wall of the second circumferential fine groove facing to the side of the equatorial plane and a third auxiliary land part having such a slope that a land height gradually decreases toward a groove bottom of the main slant groove is arranged between the first joint part and the main slant groove.

18. A pneumatic tire according to claim 17, wherein an angle between the ground contact face of the first joint part and the slope of the third auxiliary land part is within a range of 135–170°.

* * * * *